United States Patent
Denzler et al.

(10) Patent No.: US 10,411,276 B2
(45) Date of Patent: Sep. 10, 2019

(54) DEVICE AND METHOD FOR SUPPLYING A FUEL CELL BATTERY

(71) Applicant: Hexis AG, Winterthur (CH)

(72) Inventors: Roland Denzler, Weisslingen (CH); Ralf Kober, Winterthur (CH); Thomas Gamper, Diessenhofen (CH)

(73) Assignee: HEXIS AG, Winterthur (CH)

( * ) Notice: Subject to any disclaimer, the term of this patent is extended or adjusted under 35 U.S.C. 154(b) by 152 days.

(21) Appl. No.: 14/931,896

(22) Filed: Nov. 4, 2015

(65) Prior Publication Data

US 2016/0141649 A1     May 19, 2016

(30) Foreign Application Priority Data

Nov. 18, 2014    (EP) ..................... 14193713

(51) Int. Cl.
| | |
|---|---|
| *H01M 8/04* | (2016.01) |
| *H01M 8/04089* | (2016.01) |
| *H01M 8/04082* | (2016.01) |
| *H01M 8/0438* | (2016.01) |
| *H01M 8/04664* | (2016.01) |
| *H01M 8/04746* | (2016.01) |
| *H01M 8/124* | (2016.01) |

(52) U.S. Cl.
CPC ... *H01M 8/04089* (2013.01); *H01M 8/04201* (2013.01); *H01M 8/04395* (2013.01); *H01M 8/04686* (2013.01); *H01M 8/04753* (2013.01); *H01M 8/04388* (2013.01); *H01M 2008/1293* (2013.01)

(58) Field of Classification Search
CPC ..................... H01M 8/04089; H01M 8/04104
See application file for complete search history.

(56) References Cited

U.S. PATENT DOCUMENTS

| | | | |
|---|---|---|---|
| 2010/0167140 A1* | 7/2010 | Balliet .............. | H01M 8/04029 429/428 |
| 2010/0273081 A1* | 10/2010 | Ishikawa ........... | H01M 8/04089 429/443 |
| 2013/0089801 A1* | 4/2013 | Takeshita .......... | H01M 8/04097 429/446 |

FOREIGN PATENT DOCUMENTS

| | | |
|---|---|---|
| DE | 102012104146 A1 | 1/2013 |
| DE | 102012018102 A1 | 3/2014 |
| EP | 1205993 A1 | 5/2002 |
| JP | 2007149496 A | 6/2007 |

OTHER PUBLICATIONS

Extended European Search Report dated Jun. 5, 2015 in European Patent Application No. 14193713.6, filed Nov. 18, 2014.

* cited by examiner

*Primary Examiner* — Osei K Amponsah
(74) *Attorney, Agent, or Firm* — Global IP Counselors, LLP

(57) ABSTRACT

A device in which an environmental air flow is monitored by a monitoring element and in which a natural gas flow is interrupted by a shut-off element on recognition of an insufficient environmental air flow. To allow a continuous operation of the fuel cell battery the monitoring element is short-circuited by a bridging device and that its operability can thus be checked without the environmental air flow having to be interrupted. This allows a permanent operation of the fuel cell battery.

11 Claims, 1 Drawing Sheet

DEVICE AND METHOD FOR SUPPLYING A FUEL CELL BATTERY

CROSS-REFERENCE TO RELATED APPLICATIONS

This application claims priority to EP Application No. 14193713.6, filed Nov. 18, 2014, the contents of which is hereby incorporation herein by reference.

BACKGROUND

Field of Invention

The invention relates to a device or supplying a fuel cell battery and to a method for supplying a fuel cell battery.

Background Information

Fuel cells and thus also fuel cell batteries are elements of fuel cell systems and allow a utilization of energy of a fuel by energy conversion. In this respect, both electric energy, which is generated on the basis of electrochemical processes, and thermal energy, which arises in the form of hot waste gases, can be utilized. Gaseous flows of two reactants are conducted separately through the cells for this purpose. The first reactant, which is in particular environmental air, contains oxidizing components; the second reactant contains reducing components. A gas which in particular contains methane (e.g. natural gas) is used as the second reactant which is conducted through a reformer prior to the entry into the cells and which is there converted into the reducing components of hydrogen and carbon monoxide.

The reactants are fed into the fuel cell battery in a quantity ratio which is characterized by the so-called air number (or air ratio) $\lambda$ related to the stoichiometry. So that no reducing components, that is non-combusted components, of the second reactant are no longer contained in the exhaust gas flow, it must be ensured that the air number $\lambda$ is always larger than or equal to 1. It is thus ensured that there is always sufficient oxygen present for the complete oxidation of the hydrogen and of the carbon monoxide and thus a reliable operation of the fuel cell battery is ensured.

It must in particular be ensured that, with an insufficient first reactant flow, that is in particular with an insufficient environmental air flow, the second reactant, that is in particular natural gas, is not still supplied to the fuel cell battery. If natural gas were also still to be supplied in this case, it could have the result that non-combusted hydrogen and non-combusted carbon monoxide leaves the fuel cell battery and combusts in an uncontrolled manner outside the fuel cell battery.

It is known that the first reactant flow is monitored by a monitoring element which can generate an error signal in dependence on a parameter of the first reactant flow, said error signal indicating an insufficient first reactant flow. The monitoring element can, for example, be designed as a pressure switch which is arranged in parallel with a pressure drop generation element, for example in the form of a diaphragm. The pressure switch generates an error signal when a pressure drop at the pressure drop generation element is smaller than a threshold value. This is the case when the throughflow of the first reactant through the pressure drop generation element is too small. This error signal is received by an automatic firing device which, in response to said error signal, controls a shut-off element which interrupts the second reactant flow, that is in particular a natural gas flow.

So that the described interruption works reliably on the presence of an insufficient first reactant flow, the monitoring element must naturally also operate without error, that is always generate the error signal whenever necessary. It is a legal requirement in at least some countries that the operational reliability of the monitoring element is checked regularly, for example at least once every 24 hours. With known systems, for this purpose the supply of the fuel cell battery is deliberately interrupted at regular intervals, for example every 24 hours, and the fuel cell battery is thus shut down. As soon as the supply of the fuel cell battery with the two reactants is interrupted, a functional monitoring element generates the named error signal. If this is the case, the fuel cell battery can be started up again. If no error signal is generated, there is a defect in the monitoring element and the fuel cell battery may not be started up again without a previous further check.

The shutting down and subsequent starting up of a fuel cell battery interrupts the electric power generation of the fuel cell system, requires energy and additionally has negative effects on the service life of the fuel cell battery.

SUMMARY

In this light, it is in particular the object of the invention to provide an apparatus and a method for supplying a fuel cell battery which allow a high efficiency and/or a gentle operation of the fuel cell battery. This object is satisfied in accordance with the invention by a device having the features described herein.

In accordance with the invention, the device for supplying a fuel cell battery has a first supply line for supplying a first gaseous reactant in a first reactant flow and a second supply line for supplying a second gaseous reactant in a second reactant flow. A monitoring element of the device is designed such that it can generate an error signal in dependence on a parameter of the first reactant flow, said error signal indicating an insufficient first reactant flow. An automatic firing device can receive the monitoring signal and can control a shut-off element arranged in the second supply line such that it interrupts the second reactant flow.

The device furthermore has a bridging device which can adapt an active state and an inactive state and is designed and arranged such that the monitoring element can generate the error signal in dependence on a parameter of the first reactant flow in the inactive state of the bridging device and a functional monitoring element reliably generates the error signal in the active state of the bridging device. The bridging device is therefore designed such that it can provoke an error signal of the monitoring element independently of the actually present first reactant flow. The monitoring element can thus also be checked as to its operational reliability with a still maintained first reactant flow and thus in the ongoing operation of the fuel cell battery. The device in accordance with the invention thus allows a permanent operation of the fuel cell battery in which the operational reliability of the monitoring element can nevertheless be checked and thus ensured. The permanent operation possible in this way also satisfies the above-named legal requirements. The device in accordance with the invention thus makes superfluous a shutting down and the subsequent starting up of the fuel cell battery for checking the monitoring element. No energy thus has to be used for this, which allows a very high efficiency of the fuel cell battery. Electric current can also be generated continuously by the fuel cell system. In addition, the fuel cell battery is not strained by a regular shutting down and starting up, which allows a gentle operation of the fuel cell battery.

The named parameter of the first reactant current in dependence on which the monitoring element can generate the error signal can, for example, be designed as a throughflow quantity, a pressure or a pressure drop at a pneumatic element, in particular at a pressure drop generation element such as a nozzle or a diaphragm. The parameter can be measured directly or, such as a throughflow quantity, for example, can be derived from other measured values such as a pressure drop. The monitoring element is then designed such that it evaluates the named parameter and, if specific conditions are present such as a falling below or an exceeding of limit values or threshold values, recognizes an insufficient first reactant flow and generates an error signal as a consequence thereof.

The first reactant is in particular environmental air and the second reactant is in particular a gas containing methane, such as natural gas. The natural gas is conducted through a reformer before the entry into the cells and is there inter alia converted into the reducing components of hydrogen and carbon monoxide. No difference is made in the following description between the flows of an original reactant and of a converted reactant. The reformation processes will as a rule no longer be explicitly named; it will rather tacitly be assumed that the user of reformers is also provided.

The fuel cells are in particular designed as high-temperature fuel cells of the SOFC type ("solid oxide fuel cell").

In an embodiment of the invention, a first pneumatic element is arranged in the first supply line. A first inlet of the monitoring element is connectable to the first feed line directly before the first pneumatic element and a second inlet of the monitoring element is connectable to the first supply line within or directly behind the first pneumatic element. The bridging device is designed and arranged such that it connects the first and second inlets of the monitoring element in the active stand and such that the first inlet of the monitoring element is connected to the first supply line directly before the first pneumatic element and the second inlet of the monitoring element is connected to the first supply line within or directly behind the first pneumatic element in the inactive state and in addition the first and second inlets of the monitoring element are separate from one another. The connection between the second inlet of the monitoring element and the first supply line is designed in this respect such that a conclusion can reliably be drawn on the throughflow through the first pneumatic element from the detected pressure difference between the first and second inlets of the monitoring element. Where exactly the connection between the second inlet of the monitoring element and the first supply line ends depends on the type of construction of the first pneumatic element.

The monitoring element is thus so-to-say short-circuited in the active state. On such a short circuit, a functional monitoring element must immediately generate an error signal. If this is not the case, there is a defect in the monitoring element which is recognized by the automatic firing device. The monitoring element can monitor the first reactant flow as usual in the inactive state of the bridging device.

This design allows a simple and thus inexpensive implementation of the bridging device and thus an inexpensive apparatus for supplying a fuel cell battery.

In an embodiment of the invention, the bridging device has a 2/3 way valve which is controllable by the automatic firing device. A 2/3 way valve has two positions and three connectors. A change between the active state and the inactive state of the bridging device can be achieved by a change of the positions of the 2/3 way valve. The three connectors of the 2/3 way valve are connected to the first inlet of the monitoring element, to the second inlet of the monitoring element and to the first supply line.

Such 2/3 way valves are available in a large selection and at favorable prices. Such 2/3 way valves are additionally tried and tested and robust. The bridging device can thus be implemented in a particularly inexpensive and operatively safe manner.

The 2/3 way valve is in particular designed and arranged such that it connects the first and second inlets of the monitoring element in the active state of the bridging device and shuts off a connection line to the first supply line within or directly behind the first pneumatic element and connects the second inlet of the monitoring element of the first supply line within or directly behind the first pneumatic element in the inactive state and shuts off a connection line to the first inlet of the monitoring element.

In an embodiment of the invention, the first pneumatic element is designed as a pressure drop generation element, in particular as a nozzle, a restrictor, a so-called laminar flow element or a diaphragm, and specifically as a Venturi nozzle. If the first pneumatic element is designed as a nozzle, and in particular as a Venturi nozzle, the second inlet of the monitoring element is thus in particular connected to the first supply line within the Venturi nozzle. The named connection in particular ends at the narrowest point, the so-called nozzle throat of the Venturi nozzle. The Venturi nozzle can also have an annular clearance surrounding the nozzle throat in which the named connection can end. If the first pneumatic element is designed as a diaphragm, the second inlet of the monitoring element is connected to the first supply line directly after the diaphragm.

The monitoring element is in particular designed such that it evaluates a pressure difference before and behind the pressure drop generation element.

It is thus possible to draw a conclusion on the throughflow quantity of the first reactant flow through the first pneumatic element in a simple manner from a pressure drop at the first pneumatic element or the pressure drop can be utilized as a measure for the throughflow quantity. This allows a simple and inexpensive monitoring of the first reactant flow.

In an embodiment of the invention, the monitoring element is designed as a pressure switch which generates the error signal on a pressure difference below a threshold value. This allows a simple and reliable recognition of a sufficient reactant flow, on the one hand. In addition, such pressure switches are available in a large selection and at favorable prices and they are tried and tested and robust. The bridging device can thus be implemented in a particularly inexpensive and operatively safe manner.

The monitoring element can also be designed as a pressure sensor by means of which a continuous pressure measurement can be carried out. In this case, a zero point of the pressure sensor can be checked and corrected in the active state of the monitoring device. A so-called zero-point correction or a so-called calibration of the pressure sensors can thus take place.

The above-named object is also satisfied by a method for supplying a fuel cell battery in which a first gaseous reactant is supplied in a first reactant flow via a first supply line and a second gaseous reactant is supplied in a second reactant flow via a second supply line. An error signal can be generated by means of a monitoring element in dependence on a parameter of the first reactant flow, said error signal indicating an insufficient first reactant flow and being able to be received by an automatic firing device. The second reactant flow can be interrupted by a shut-off element arranged in the second supply line and controllable by the automatic firing device. A bridging device is provided which can be brought by the automatic firing device into an inactive state in which the monitoring element can generate the signal in dependence on a parameter of the first reactant flow and into an active state in which a functional monitoring element reliably generates the error signal.

In an embodiment of the invention, the automatic firing device closes the shut-off element in an inactive state of the bridging device and on a presence of the error signal and keeps it open in an active state of the bridging device and on a presence of the error signal.

In an embodiment of the invention, the automatic firing device recognizes an operational reliability of the monitoring element in the active state of the bridging device and on a presence of the error signal and recognizes a malfunction of the monitoring element in the active state of the bridging device and on no presence of the error signal.

Since the check of the monitoring element only takes up a very short time, in particular only a few seconds, the operation of the fuel cell battery can be continued in an uninfluenced manner during the check.

In an embodiment of the invention, the automatic firing device brings the bridging device, starting from the inactive state, into the active state and subsequently back into the inactive state again in time intervals of, for example, 24 hours. A regular check of the monitoring element can thus be ensured and legal requirements can additionally be observed.

In an embodiment of the invention, the automatic firing device brings the bridging device, starting from the active state, back into the inactive state directly after receiving an error signal from the monitoring element. It can thus be achieved that a check of the first reactant flow is only interrupted for a very short time.

Further advantages, features and details of the invention result with reference to the following description of embodiments and with reference to drawings in which elements which are the same or have the same function are provided with identical reference numerals.

BRIEF DESCRIPTION OF THE DRAWINGS

The invention will be explained in more detail hereinafter with reference to the drawings.

DETAILED DESCRIPTION OF THE EMBODIMENTS

Figure 1:
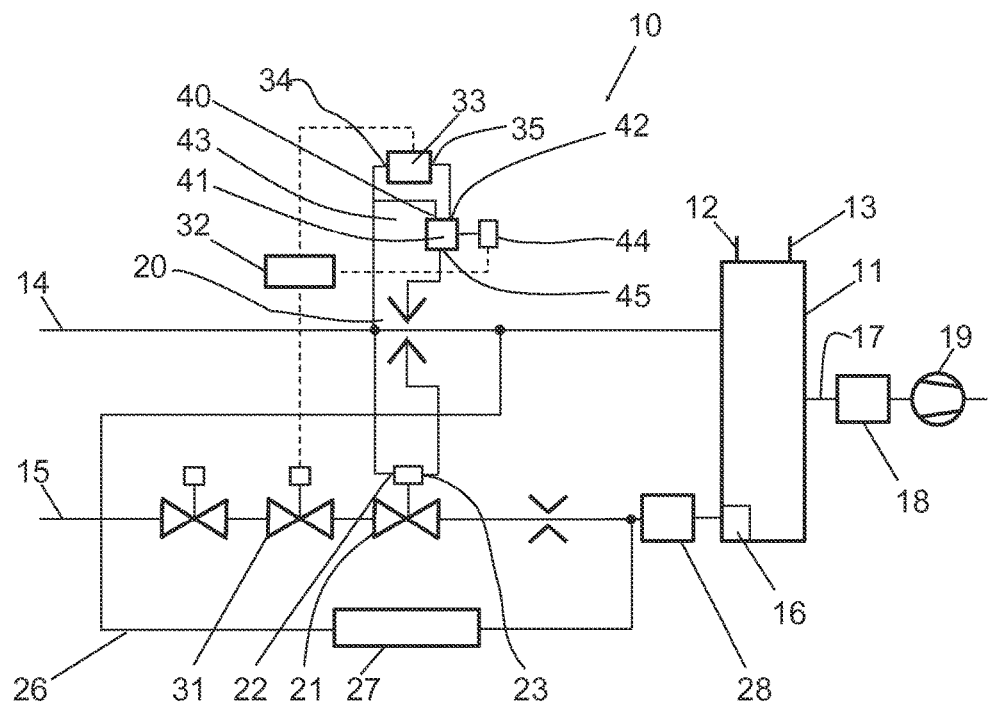
FIG. 1 is a schematic representation of a fuel cell system having a fuel cell battery and a device for its supply.

In accordance with FIG. 1, a fuel cell system 10 has a fuel cell battery 11 having a number of fuel cells not shown individually. Electric energy generated in the fuel cell battery 11 can be led off over poles 12, 13. A first gaseous reactant in the form of environmental air is supplied to the fuel cell battery 11 via a first supply line 14 in a first reactant flow. A second gaseous reactant in the form of natural gas is supplied to the fuel cell battery 11 via a second supply line 15 in a second reactant flow. The natural gas is first converted into a reactive form by a reformer 16. Waste heat which simultaneously arises with the electric energy is supplied in the form of a hot exhaust gas as an exhaust gas flow from the fuel cell battery 11 via an exhaust gas line 17 to a heat exchanger 18 in which the thermal energy is extracted from the exhaust gas. The exhaust gas cooled in this manner is sucked in via a fan 19 and is output to the environment.

A first pneumatic element in the form of a Venturi nozzle 20, that is a pressure drop generation element, is arranged in the first supply line 14. A conclusion can be drawn on the throughflow quantity of the environmental air flow and thus on a parameter of the first reactant flow from the pressure drop at the Venturi nozzle 20 or the pressure drop is a measure for the throughflow quantity of the environmental air flow.

A suitable natural gas flow, that is a second reactant flow, has to be set to a given environmental air flow. The natural gas flow has to be set such that the air number $\lambda$ is always greater than 1, but is nevertheless as small as possible. For this purpose, a second pneumatic element in the form of a proportional pressure regulator 21, that is a pressure setting valve, is arranged in the second supply line 15. A first regulating inlet 22 of the proportional pressure regulator 21 is connected to the first supply line 14 directly before the Venturi nozzle 20 and a second regulating inlet 23 of the proportional pressure regulator 21 is connected to the first supply line 14 at the narrowest cross-section of the Venturi nozzle 20. A pressure is thus set at the outlet of the proportional pressure regulator 21 which is at a fixed ratio to the pressure drop at the Venturi nozzle 20 and is thus dependent on the throughflow quantity of the environmental air flow. The named ratio amounts, for example, to 11:1. A desired ratio of the environmental air flow to the natural gas flow and thus a desired air number $\lambda$ can thus be set.

A supply line 26 opens behind the proportional pressure regulator 21 in the direction of flow into the second supply line 15 which branches off from the first supply line 14 behind the Venturi nozzle 20. Further components, not relevant to the present invention, are arranged in the supply line 26 which are here shown as only one component 27. Environmental air which is required in the reformer 16 for converting the natural gas is supplied via the supply line 26. The natural gas and the environmental air are mixed before the introduction into the reformer 16 in a mixing element 28 arranged after the introduction of the environmental air into the second supply line 15 in the direction of flow.

A shut-off element in the form of a shut-off valve 31 is arranged before the proportional pressure regulator 21 in the direction of flow in the second supply line 15. The second supply line 15 can be shut off and the natural gas flow can thus be interrupted by means of the shut-off valve 31. A fast and reliable shutting down of the fuel cell battery 11 can thus be achieved. The shut-off valve 31 is controlled by an automatic firing device 32 which is in signal connection with a monitoring element in the form of a pressure switch 33. The automatic firing device 32 is additionally in signal connection with a plurality of the described components, with these connections not being shown for reasons of clarity. A pressure sensor can also be used for a continuous pressure measurement instead of a pressure switch.

A first inlet 34 of the pressure switch 33 is connected both to the first supply line 14 directly before the Venturi nozzle 20 and to a second connector 40 of a 2/3 way valve 41. The 2/3 way valve 41 is shown in more detail in FIG. 2. A second inlet 35 of the pressure switch 33 is connected to a second connector 42 of the 2/3 way valve 41. The 2/3 way valve 41 is part of a bridging device 43 and can be brought into two different positions by an adjustment device 44, with one position corresponding to an active state and the other position corresponding to an inactive state of the bridging device 43. The adjustment device 44 is controlled by the automatic firing device 32 and sets the named positions of the 2/3 way valve 41 according to its set values. A third connector 45 of the 2/3 way valve 41 is connected to the first supply line 14 at the narrowest cross-section of the Venturi nozzle 20. The adjustment device 43 is composed of the 2/3 way valve 41, the adjustment device 44 and the connection to the first inlet 34 of the pressure switch 33.

Figure 2:
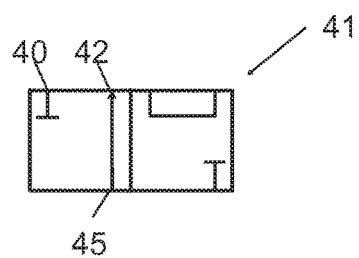
FIG. 2 is a 2/3 way valve of a bridging device of the device for supplying a fuel cell battery of FIG. 1.

The design of the 2/3 way valve 41 will be described in more detail with reference to FIG. 2. The 2/3 way valve 41 can adopt two positions which are shown next to one another in FIG. 2.

The first position shown on the left side corresponds to the inactive state of the bridging device 43. The first connector 40 and thus the connection to the first inlet 34 of the pressure switch 33 is shut off in this position. The second connector 42 and the third connector 45 are connected such that the second inlet 35 of the pressure switch 33 is connected to the first supply line 14 at the narrowest cross-section of the Venturi nozzle 20. The pressure switch 33 is thus arranged in parallel with the Venturi nozzle 20 in this position.

The second position shown on the right side corresponds to the active state of the bridging device 43. The first connector 40 and the second connector 42 are connected in this position. The first inlet 34 and the second inlet 35 of the pressure switch 33 are thus connected so that the same pressure is applied at both inlets 34 and 35. The third connector 45 is shut off so that there is no connection to the first supply line 14.

The pressure switch 33 is designed such that it generates an error signal when a pressure difference of the pressures at the second inlet 35 and at the first inlet 34 is smaller than a threshold value. The pressure switch 33 is arranged in parallel with the Venturi nozzle 20 in the inactive state of the bridging device 43. As long as the environmental air flow is sufficient and as long as thus the pressure drop at the Venturi nozzle 20 is greater than the threshold value, the pressure switch 33 does not generate any error signal. If the environmental air flow is, however, insufficiently large, that is the pressure drop falls below the threshold value, the pressure switch 33 generates an error signal which is received by the automatic firing device 32. Since the automatic firing device 32 controls the adjustment device 44 of the 2/3 way valve 41, it knows the position of the 2/3 way valve 41 and thus knows whether the bridging device 43 is in the active state or in the inactive state. If an error signal is received and if the bridging device 43 is in the inactive state, an insufficient environmental air flow is present and the automatic firing device 32 interrupts the natural gas flow by closing the shut-off valve 31.

To check the function of the pressure switch 33, the automatic firing device 32 controls the setting device 44 of the 2/3 way valve 41 such that the active state of the bridging device 43 is set. As a consequence of this, the first and second inlets 34, 35 of the pressure switch 33 are connected to one another. The same pressure is thus applied at both inlets 34, 35 and the pressure difference between the two inlets 34, 35 is zero. A functional pressure switch 33 must, in response to this, reliably generate an error signal at least after a short response time, said error signal indicating an insufficient environmental air flow. Since the automatic firing device 32 knows that the bridging device 43 is in the active state, the error signal does not, however, result in the interruption of the natural gas flow, that is the shut-off valve 31 remains open. The error signal is rather interpreted as a sign of the operational reliability of the pressure switch 33. If the pressure switch 33 were not to generate any error signal in this case, a conclusion would be drawn from this on a malfunction of the pressure switch 33 and as a consequence of this the natural gas flow would be interrupted by closing the shut-off valve 31. As soon as the automatic firing device 32 receives the error signal, it again sets the bridging device 43 into the inactive state.

If a pressure sensor is used instead of a pressure switch, a zero point correction can be carried out for the pressure sensor in the active state of the bridging device 43.

Since the check of the pressure switch 33 only takes up a very short time, in particular only a few seconds, the operation of the fuel cell battery 11 can be continued in an uninfluenced manner during the check.

The described check of the pressure switch 33 by the bringing of the bridging device 43, starting from the inactive state, into the active state and subsequently back into the inactive state again is carried out by the automatic firing device 32 at regular intervals, in particular every 24 hours.

The invention claimed is:

1. A device for supplying a fuel cell battery, comprising:
   a first supply line configured to supply a first gaseous reactant in a first reactant flow;
   a second supply line configured to supply a second gaseous reactant in a second reactant flow;
   a monitoring element connected to the first supply line, the monitoring element configured to generate an error signal based on a parameter of the first reactant flow, the error signal indicating an insufficient first reactant flow;
   an automatic firing device configured to receive the error signal;
   a shut-off element arranged in the second supply line, being controlled by the automatic firing device, and being configured to interrupt the second reactant flow;
   a first pneumatic element arranged in the first supply line, the monitoring element includes a first inlet connectable to the first supply line directly before the first pneumatic element and a second inlet connectable to the first supply line within or directly behind the first pneumatic element; and
   a bridging device configured to adopt an active state and an inactive state,
   the monitoring element being configured to generate the error signal when the bridging device is in the active state,
   the automatic firing device being configured to control the shut-off element to interrupt the second reactant flow if the error signal is received and the bridging device is in the inactive state,
   the bridging device comprising a valve, and
   the monitoring element being directly connected to a connection of the valve.

2. A device in accordance with claim 1,
   wherein the bridging device is configured and arranged so as to connect the first and second inlets of the monitoring element in the active state, and the first inlet of the monitoring element being connected to the first supply line directly before the first pneumatic element and the second inlet of the monitoring element being connected to the first supply line directly behind the first pneumatic element in the inactive state, and such that the first and second inlets of the monitoring element are separate from one another.

3. A device in accordance with claim 2, wherein
   the bridging device has a 2/3 way valve controllable by the automatic firing device.

4. A device in accordance with claim 3, wherein
   the 2/3 way valve is configured and arranged so as to connect the first and second inlets of the monitoring element in the active state of the bridging device and shut off a connection to the first supply line within or directly behind the first pneumatic element, and connect the second inlet of the monitoring element to the first supply line within or directly behind the first pneumatic element in the inactive state of the bridging device and shut off a connection to the first inlet of the monitoring element.

5. A device in accordance with 2, wherein the first pneumatic element is configured as a pressure drop generation element.

6. A device in accordance with claim 5, wherein the monitoring element is configured to evaluate a pressure difference before and after the pressure generation element.

7. A device in accordance with claim 6, wherein
the monitoring element is configured as a pressure switch configured to generate the error signal on a pressure difference below a threshold value.

8. A device in accordance with claim 3, wherein the first pneumatic element is configured as a pressure drop generation element.

9. A device in accordance with claim 4, wherein the first pneumatic element is configured as a pressure drop generation element.

10. A device for supplying a fuel cell battery, comprising:
a first supply line configured to supply a first gaseous reactant in a first reactant flow;
a second supply line configured to supply a second gaseous reactant in a second reactant flow;
a monitoring element configured to generate an error signal in dependence on a parameter of the first reactant flow, the error signal indicating an insufficient first reactant flow;
an automatic firing device configured to receive the error signal;
a shut-off element arranged in the second supply line, being controlled by the automatic firing device, and being configured to interrupt the second reactant flow;
a bridging device configured to adopt an active state and an inactive state and being configured and arranged such that the monitoring element is capable of generating the error signal in dependence on the parameter of the first reactant flow in the inactive state, and a functional monitoring element is capable of generating the error signal in the active state; and
a first pneumatic element arranged in the first supply line, the monitoring element including a first inlet connectable to the first supply line directly before the first pneumatic element and a second inlet connectable to the first supply line within or directly behind the first pneumatic element, and the bridging device being configured and arranged so as to connect the first and second inlets of the monitoring element in the active state, and the first inlet of the monitoring element being connected to the first supply line directly before the first pneumatic element and the second inlet of the monitoring element being connected to the first supply line directly behind the first pneumatic element in the inactive state, and such that the first and second inlets of the monitoring element are separate from one another.

11. A device for supplying a fuel cell battery, comprising:
a first supply line configured to supply a first gaseous reactant in a first reactant flow;
a second supply line configured to supply a second gaseous reactant in a second reactant flow;
a monitoring element connected to the first supply line, the monitoring element configured to generate an error signal based on a parameter of the first reactant flow, the error signal indicating an insufficient first reactant flow;
an automatic firing device configured to receive the error signal;
a shut-off element arranged in the second supply line, being controlled by the automatic firing device, and being configured to interrupt the second reactant flow;
a first pneumatic element arranged in the first supply line,
the monitoring element includes a first inlet connectable to the first supply line directly before the first pneumatic element and a second inlet connectable to the first supply line within or directly behind the first pneumatic element; and
a bridging device configured to adopt an active state and an inactive state, the monitoring element being configured to generate the error signal when the bridging device is in the active state,
the automatic firing device being configured to control the shut-off element to interrupt the second reactant flow if the error signal is received and the bridging device is in the inactive state, and
the monitoring element comprising a switch.

* * * * *